US008856305B2

(12) United States Patent
Blacka et al.

(10) Patent No.: US 8,856,305 B2
(45) Date of Patent: Oct. 7, 2014

(54) SYSTEM AND METHOD FOR ADDING A WHITELIST ENTRY VIA DNS

(75) Inventors: David Blacka, Reston, VA (US); Sean Mountcastle, Herndon, VA (US)

(73) Assignee: Verisign, Inc., Reston, VA (US)

( * ) Notice: Subject to any disclaimer, the term of this patent is extended or adjusted under 35 U.S.C. 154(b) by 139 days.

(21) Appl. No.: 13/546,155

(22) Filed: Jul. 11, 2012

(65) Prior Publication Data

US 2014/0019601 A1 Jan. 16, 2014

(51) Int. Cl.
*G06F 15/173* (2006.01)
*G06F 15/16* (2006.01)
*G06F 11/00* (2006.01)
*G06F 7/04* (2006.01)

(52) U.S. Cl.
USPC ............... 709/223; 709/206; 726/1; 726/22; 726/27

(58) Field of Classification Search
None
See application file for complete search history.

(56) References Cited

U.S. PATENT DOCUMENTS

| 7,571,325 | B1 * | 8/2009 | Cooley et al. ................ 713/181 |
| 7,600,011 | B1 | 10/2009 | Urbanek |
| 2007/0294419 | A1 * | 12/2007 | Ulevitch ....................... 709/230 |
| 2009/0083413 | A1 | 3/2009 | Levow et al. |
| 2010/0274970 | A1 * | 10/2010 | Treuhaft et al. ............... 711/118 |
| 2011/0119306 | A1 * | 5/2011 | Patil .............................. 707/783 |
| 2011/0246634 | A1 | 10/2011 | Liu et al. |
| 2011/0283357 | A1 * | 11/2011 | Pandrangi et al. ............. 726/22 |
| 2011/0289216 | A1 | 11/2011 | Szeto et al. |
| 2012/0017259 | A1 * | 1/2012 | MacCarthaigh ................. 726/1 |
| 2012/0084423 | A1 * | 4/2012 | McGleenon ................... 709/223 |
| 2012/0096261 | A1 * | 4/2012 | Ko et al. ........................ 713/168 |
| 2012/0324113 | A1 * | 12/2012 | Prince et al. .................. 709/226 |

OTHER PUBLICATIONS

"Edit Blacklists per Domain", Rackspace Email and Exchange Support Site, Jan. 2014.*
"DSNBL", Wikipedia, Jan. 2014.*
Lewis, "RFC 6471", Jan. 2012.*

* cited by examiner

*Primary Examiner* — Wen-Tai Lin
(74) *Attorney, Agent, or Firm* — MH2 Technology Law Group, LLP

(57) ABSTRACT

A method for adding a blacklisted site to a whitelist includes requesting a blacklisted site via a network, the blacklisted site having a domain name of the format <blocked-domain>. The method includes generating queries for an encoded domain, the encoded domain being of the format <nonce>.<hash>.<blocked-domain>.<static domain>, sending the queries to a recursive DNS server, and sending responses based on the queries to a cache of a web browser. The method includes requesting by the web browser the blacklisted site, adding the blacklisted site to the whitelist, sending an IP address corresponding to the blacklisted site to the web browsers, and accessing the blacklisted site.

27 Claims, 16 Drawing Sheets

SYSTEM AND METHOD FOR ADDING A WHITELIST ENTRY VIA DNS

TECHNICAL FIELD

The present disclosure relates to the field of accessing web sites and, more particularly, to systems and method for adding a whitelist entry via Domain Name System (DNS).

BACKGROUND

A client computer can use a network, such as the Internet, to communicate with and identify other computers connected to the network. The client computer identifies a unique IP address for each of these other computers. The client computer may know the IP address of a computer, or may need to search for this IP address using the Domain Name System (DNS).

Sometimes there is reason to present a "block page" to a user, such as when the user attempts to browse to a site that is deemed inappropriate (malicious, gambling, porn, time-wasting, etc). Thus, these sites may be blocked, and the user is presented with a block page. However, sometimes the user needs to continue to a blocked site.

Traditional approaches for maintaining "whitelists," which are, for example, lists of authorized IP addresses, require either distributing the whitelist updates through a central point, for example, a central datacenter running a database, or synchronizing the whitelist updates between web servers that handle a "continue to site" button, which may be included on a "block page." Both of these approaches provide slow access for a user.

In the past, in an effort to speed up web browsing, browsers maintained their own DNS caches. However, these DNS caches do not always respect the Time to Live (TTL), which limits the time period an IP address is whitelisted, specified in a specific DNS record. This will cause problems for a user who wishes to continue to the blocked site, because the bad IP address is stuck in a user's browser cache, and the user will not be able to go to a web page corresponding to that bad IP address. In the past, service providers have asked users to explicitly flush the users' browser caches, or, when a user is not able to flush the browser cache, to simply quit and restart the browser. This requires the customer to take these measures themselves, and provides for a burdensome user experience. Thus, there is a need to automatically flush a user's browser cache without burdening the user.

SUMMARY

Consistent with disclosed embodiments, a computer-implemented method, which may be performed by a processor, for adding a blacklisted site to a whitelist includes requesting, by a web browser via a network, a blacklisted site, the blacklisted site having a domain name of the format <blocked-domain>; generating at least one query for an encoded domain, the encoded domain being of the format <nonce>.<hash>.<blocked-domain>.<static domain>; sending the at least one query to at least one recursive DNS server; sending at least one response based on the at least one query to a cache of the web browser; requesting, by the web browser, the blacklisted site via a network; adding the blacklisted site to the whitelist stored on at least one recursive DNS server; sending an IP address corresponding to the blacklisted site to the web browser; and accessing, by the web browser, the blacklisted site.

Consistent with disclosed embodiments a system for adding a blacklisted site to a whitelist may include a processor and a memory containing executable code, that when executed by the processor, causes the processor to perform a method. The method may include requesting, by a web browser via a network, a blacklisted site, the blacklisted site having a domain name of the format <blocked-domain>; generating at least one query for an encoded domain, the encoded domain being of the format <nonce>.<hash>.<blocked-domain>.<static domain>; sending the at least one query to at least one recursive DNS server; sending at least one response based on the at least one query to a cache of the web browser; requesting, by the web browser, the blacklisted site via a network; adding the blacklisted site to the whitelist stored on at least one recursive DNS server; sending an IP address corresponding to the blacklisted site to the web browser; and accessing, by the web browser, the blacklisted site.

Consistent with disclosed embodiments a non-transitory computer-readable medium may store executable code for a method. The method may include requesting, by a web browser via a network, a blacklisted site, the blacklisted site having a domain name of the format <blocked-domain>; generating at least one query for an encoded domain, the encoded domain being of the format <nonce>.<hash>.<blocked-domain>.<static domain>; sending the at least one query to at least one recursive DNS server; sending at least one response based on the at least one query to a cache of the web browser; requesting, by the web browser, the blacklisted site via a network; adding the blacklisted site to the whitelist stored on at least one recursive DNS server; sending an IP address corresponding to the blacklisted site to the web browser; and accessing, by the web browser, the blacklisted site.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION

Reference will now be made in detail to the disclosed embodiments of the invention, examples of which are illustrated in the accompanying drawings. Wherever possible, the same reference numbers will be used throughout the drawings to refer to the same or like parts.

Figure 1:
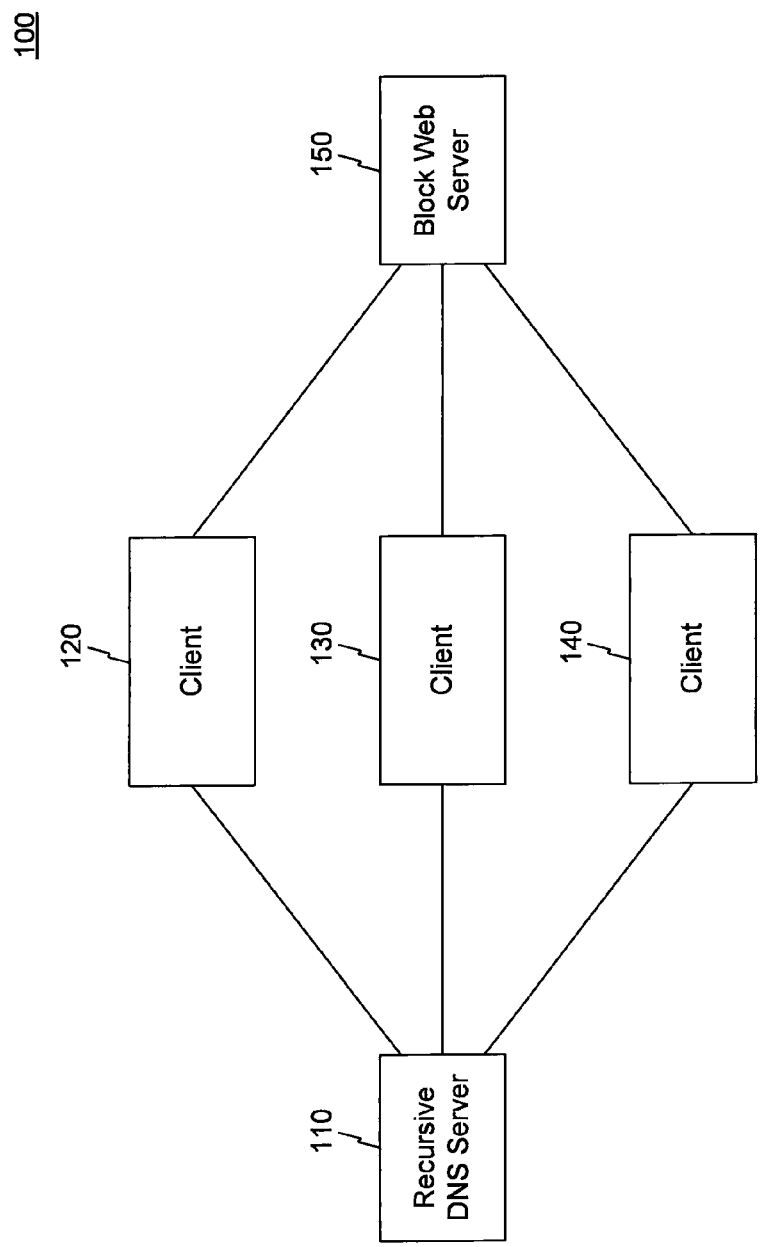
FIG. 1 is block diagram of a system consistent with disclosed embodiments.

FIG. 1 shows an exemplary system 100. System 100 includes a recursive DNS server 110. There may be more than one recursive DNS server 110 (not shown), and each recursive DNS server 110 may communicate with another recursive DNS server 110. Recursive DNS server 110 may be maintained by an Internet service provider, a domain registrar, or the like. Recursive DNS server 110 may store whitelisted web sites, which are web sites with approved content, and may store blacklisted web sites, which are web sites with unapproved content.

Clients 120, 130, and 140 may be computers that users use to access recursive DNS server 110 via the Internet. Clients 120, 130, and 140 may use Internet browsers to access web pages via the Internet.

Block web server 150 is a server that stores blocked web sites and their corresponding IP addresses. Blocked web sites are also known as blacklisted web sites, because these blocked web sites are associated with blacklisted material. Sites can include malicious sites, gambling sites, porn sites, time-wasting sites, and the like. Block web server 150 may be maintained by an Internet service provider, a domain registrar, or the like. In disclosed embodiments, when a domain is blacklisted (blocked), the user is redirected to a web page, called a "block page," that notifies the user that the site they were trying to reach is blocked and why. Recursive DNS server 110, clients 120, 130, and 140, and block web server 150 may interact via the Internet.

All web sites and web pages have IP addresses, numerical identifiers, typically represented by a particular quantity of octets, such as four octets for IPv4 and 16 octets for IPv6. However, such numerical identifiers are difficult for users to remember. Thus, a Domain Name System ("DNS") is provided, such that a user may enter a text identifier consisting of a multi-level domain name. If a user opens a web browser on client 120, for example, and types, e.g., http://www.example.com, into the browser, a recursive DNS process will begin, to "resolve" the domain name, that is, to convert the text identifier to a numeric IP address. The browser will first try to determine an IP address that corresponds to http://www.example.com using the browser's cache. The browser's cache can store many frequently used domain names and corresponding IP addresses. If the corresponding IP address is not found in the browser's cache, a DNS query is sent to recursive DNS servers 110 to resolve the domain name. However, if the entered domain name is present in the browser's cache but corresponds to a blacklisted site, the user will not be able to access the site, until the domain name and IP address of the blacklisted site is removed from the browser's cache.

Disclosed embodiments push bad entries out of a browser's cache by filling the cache with new entries. Disclosed embodiments include a feature called blocked site bypass used in Recursive DNS. This feature does not require the use of a proxy and allows customers to access a blacklisted site for an extended period of time. Disclosed embodiments update a DNS whitelist, which is a list of authorized IP addresses, for an extended period of time based on the receipt of DNS queries that encode the whitelist with entry details, such as IP address and machine locations, which are included in the query name. This approach and design enables a whitelist to be updated faster without having to distribute a whitelist's status to many different sites and servers.

Figure 2:
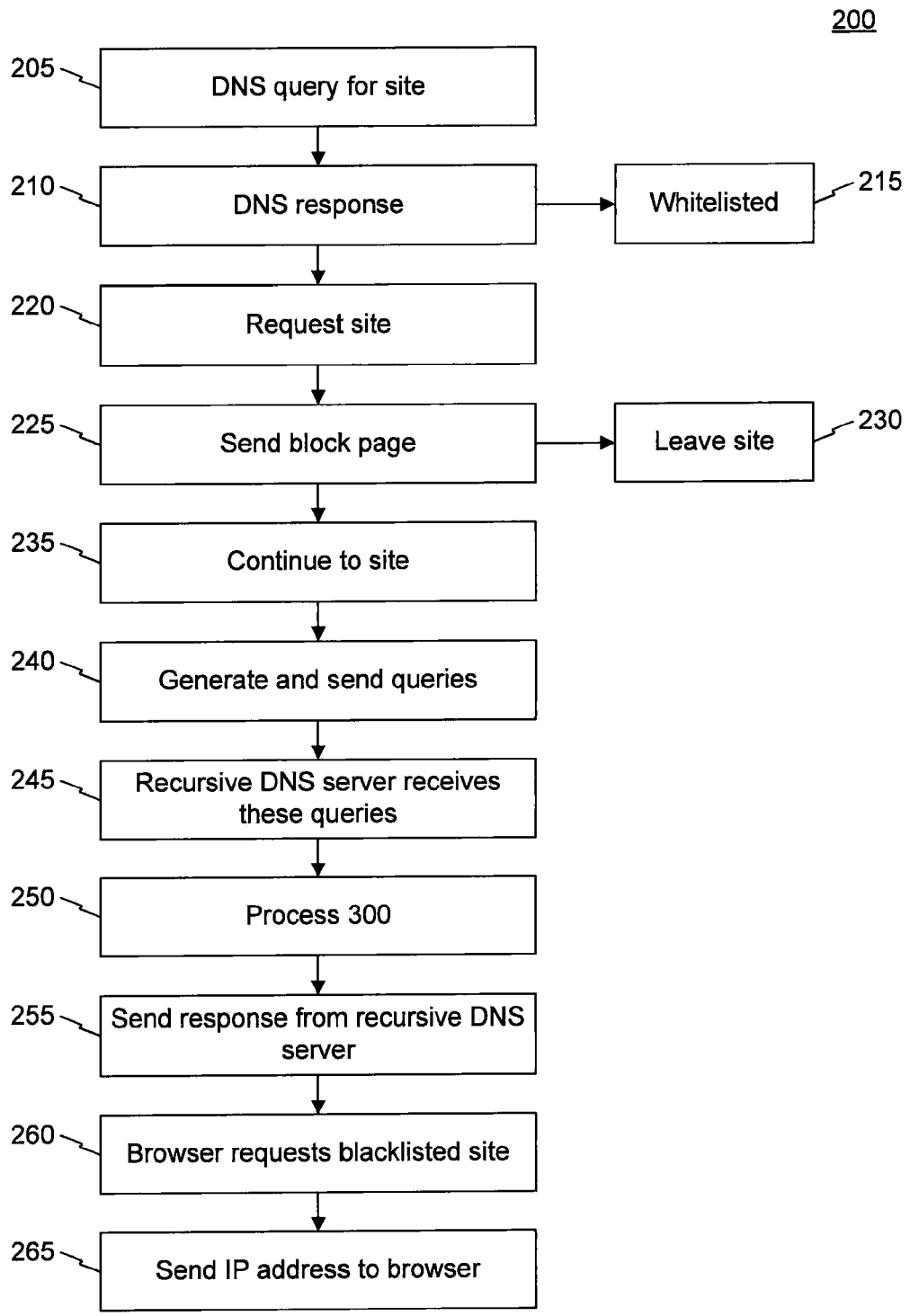
FIG. 2 is a flow chart describing user access to a blacklisted web site, consistent with disclosed embodiments.

FIG. 2 shows a process 200 in which a user accesses a blacklisted web site. A user, using client 120 for example, may enter a web site address, such as www.example.com, into a browser, may click a link that links to the address, or do something else to access a web site. It is determined if the domain name or the web site is blacklisted by Recursive DNS blacklists.

To determine if the site is blocked, the user's web browser sends a DNS query for www.example.com to recursive DNS server 110, shown at step 205, in FIG. 2. Recursive DNS server 110 may then try to determine if the user should be allowed to access the website.

As shown at step 210, if it is determined that recursive DNS server 110 finds a corresponding whitelisted IP address, corresponding to www.example.com, stored in recursive DNS server 110's cache (not blacklisted), recursive DNS server 110 may send a response and transmit the IP address to the user's browser, thereby allowing the user access to the site, shown at step 215. If it is determined that the site is blacklisted or blocked, a DNS response so indicating this, along with the "A record" corresponding to recursive DNS server 110, is sent from recursive DNS server 110 to client 120. An "A record" is an IPv4 address for a name server machine. Other embodiments can use other records, such as AAAA records, which are IPv6 addresses for name servers, and the like.

At 220, the user's browser then sends a request for the web site www.example.com to block web server 150. At 225, block web server 150 then sends a "block page" to the user's browser, where it is presented to the user.

Figure 4:
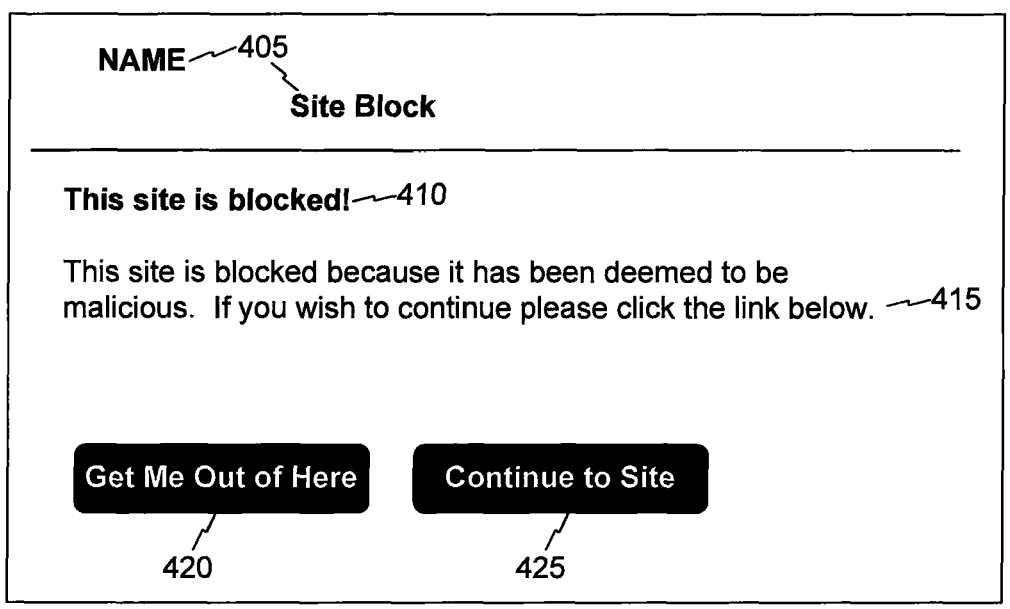
FIG. 4 is a diagram of an exemplary block page, consistent with disclosed embodiments.

FIG. 4 shows an exemplary block page 400. Block page 400 may include a title 405, which may indicate an Internet service provider, domain name registrar, or the like which may own and run the block page. Block page 400 may include a statement 410 indicating that the site the user is trying to access is blocked. Block page 400 may include a reason why the page is blocked 415, such as the site is malicious. Block page 400 may include selectable items, such as buttons 420 and 425, which may give the user a choice to leave the site or continue to the site.

Referring back to FIG. 2, at step 225, a block page is presented to the user with a reason why the site is blocked, such as the site being malicious. Block web server 150 may store the reason the site is blocked. The user may, for example, either click a button to indicate that the user does not want to access the site, such as a "Get Me Out of Here" button, or click a button to indicate that the user wants to continue to the site, such as a "Continue to Site" button. If the user clicks the "Get Me Out of Here" button, the browser may close or bring the user to a whitelisted site, shown at step 230. If the user clicks the "Continue to Site" button to bypass the block page, the process continues to step 235.

Continuing at step 240, after a user clicks the "Continue to Site" button to bypass the block page, the user's web browser sends a plurality of DNS queries to recursive DNS server 110. The number of queries can be a configurable or predetermined number, such as 1, 20, or 300. The queries may be requested by JavaScript enabled on the user's browser. The queries are generated for an encoded domain name having the format: <nonce>.<hash>.<blocked-domain>.<static domain>.

The "nonce" is a unique identifier for each of the queries. For example, if 300 queries are made, a nonce for the first query can be "1," and a nonce for the second query can be "2," and so on until the 300$^{th}$ query can have a nonce of "300."

The "hash" is a label that can be, for example, a base32#hex-encoded, such as SHA1 or MD5, a cryptographic hash of the client IP, a normalized timestamp, the blocked domain, and a shared secret. The client IP is the IP address of the client that the user is using to access the blocked site. The timestamp is the current time, rounded down to the nearest N minutes, where N is a number such as 5, for example. This will allow the hash to be valid for only 2*N minutes, in this case, 10 minutes.

The shared secret may be a binary value of arbitrary length that is shared between recursive DNS servers 110 and web servers, such as block web server 150, hosting the block pages. Note that the shared secret is not exposed to the JavaScript in the block page of the browser that generates the DNS queries. Instead, block web server 150 dynamically generates the block page, including the calculated hash in the JavaScript.

The "blocked domain" may be the domain name that has been blacklisted. The "static domain" is a constant domain that allows recursive DNS server 110 to easily recognize the query name as a whitelisting query, for example "block.vrsn.com".

Figure 3:
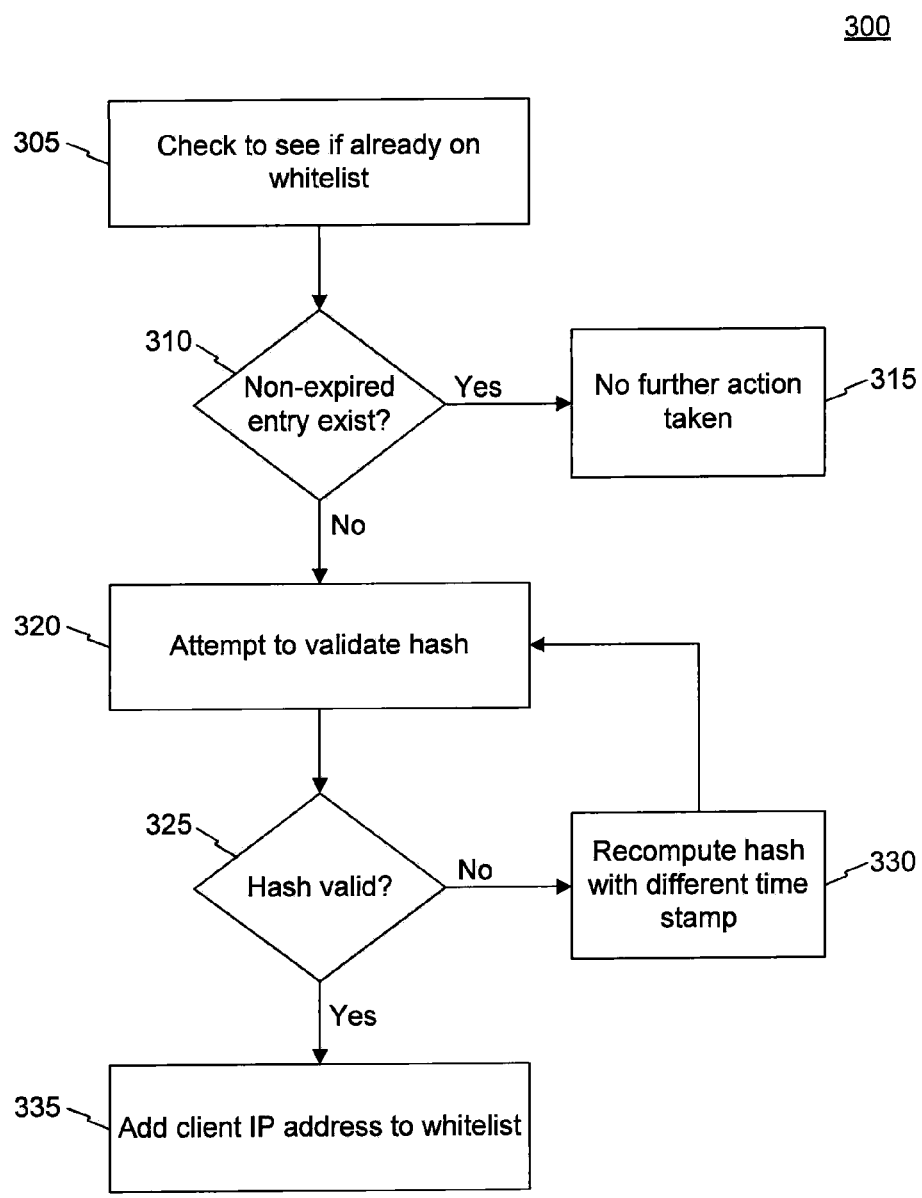
FIG. 3 is a flow chart describing in greater detail one of the steps of FIG. 2.

Referring to step 245 of FIG. 2, when recursive DNS server 110, which may use a proxy, receives these queries, recursive DNS server 110 initiates a validation process for the queries, shown at step 250. Step 250 is shown in more detail in FIG. 3, which shows a process 300 describing recursive DNS server 110's validation process for the queries.

At step 305, recursive DNS server 110 checks to see if there is already a whitelist entry for the client IP address and the blocked domain pair. At step 310, it is determined if a non-expired whitelist entry exists for blocked domain. If there is a non-expired whitelist entry, the process stops, and the user is allowed to proceed to the site, shown at step 315.

If the whitelist entry does not exist, or it has expired, then recursive DNS server 110 tries to validate the hash, where the hash comprises the client IP address, the timestamp, the shared secret, and the blocked domain, as shown at step 320. A valid hash means that recursive DNS server 110 determines that the hash, and therefore also the blocked domain, is approved to be added to a whitelist.

At step 325, it is determined if the hash if valid. If the hash fails to validate, shown at step 330, the A record for the blocked page is returned, and the hash is recomputed with a different timestamp. For example, if the timestamp is for the nearest 5 minutes rounded down, the recomputed hash would replace the time stamp of the original hash with the timestamp from 5 minutes earlier. Then the process returns to step 320 where recursive DNS server 110 tries to validate the recomputed hash.

If the hash is valid, an entry, which may be temporary, is added to the whitelist stored in recursive DNS server 110 for the client IP address and the blocked domain, shown at step 335. This whitelist entry may be valid for only the 2*N minutes the timestamp covers, where N was described above, and in which 2*N would be 10 minutes in this example. After the expiration of the whitelist entry, that is, after 10 minutes, the blocked domain name will be blacklisted for the user's IP address. Thus the user will not be able to access the site after expiration of the whitelist entry.

In addition, a message may be sent to a database owned by the Internet service provider, domain name registrar, or entity that runs recursive DNS server 110 and/or block web server 150 to indicate that a whitelisted entry should be added to a record corresponding to the user IP address and blocked domain, with the expiration time. This information can then be set to sites and machines within a predetermined amount of time, such as 45 seconds.

Referring back to FIG. 2, at step 255, recursive DNS server 110 sends a response for each of the queries back to the browser's cache, thereby filling the browser cache with entries consisting of these DNS responses. This may serve two purposes. First, this pushes the block web server IP address out of the browser's cache by filling the cache with the DNS entries. Second, this ensures enough queries are seen at recursive DNS servers 110 such that all of the recursive DNS servers 110 can update their whitelists.

At this point, the JavaScript on the user's browser waits a predetermined amount of time, such as 1 or 5 seconds, before requesting to reload the web site. Then, at step 260, the browser sends a request for the web site www.example.com. At step 265, because this web site is now whitelisted, recursive DNS server 110 sends the real IP address corresponding to www.example.com to the user's browser, and the user is able to access the web site, without receiving a block page, for the time period of 2*N, which is 10 minutes in this example.

In some embodiments, JavaScript receives the correct IP address for the site, and the web page automatically loads as if the web page were not blocked. In other embodiments, JavaScript redirects the user to a web site, such as "https://block.vrsn.com/index.html?r=<Base64 encoded URL>", on the page to which the user was redirected, and a confirmation page appears. If the user clicks on the "Yes, really go to a blocked site" button, JavaScript may decode the encoded blocked site's domain name, open a new browser window with that domain name, and close the original browser window.

By including a cryptographic hash in the whitelisting query, it becomes computationally infeasible for an attacker to generate fake whitelisting queries on behalf of a client. For example, a malicious user or attacker could not automatically generate whitelisting queries without reaching the block page, because the user does not know the shared secret. The user also cannot reuse old whitelisting queries, since the hash contains a timestamp, as a security feature. Since a large number of queries, which may differ only by "nonce," are sent to recursive DNS server 110, there is no need to coordinate whitelists among recursive server instances, because in all instances, the individual recursive servers will receive some portion of the queries.

In some embodiments, only a configured subset of the DNS queries will undergo complete processing. For example, if 300 queries are sent from the browser, only about 10% may be processed. For example, one of the first few DNS queries may result in a validation. After this validation, no additional processing would be required for that client IP and blocked domain pair until the whitelist entry expires.

For another example, only a configured percentage or number of the DNS queries for a particular client IP and blocked domain pair will be processed. In some embodiments, the number of hashes calculated per client IP address can be limited, thereby disregarding the blocked domain because most users would not be frequently browsing block sites. However, the large predetermined number of DNS queries issued from the user's browser is still necessary to push the blocked DNS entries out of the browser's cache.

Figure 5:
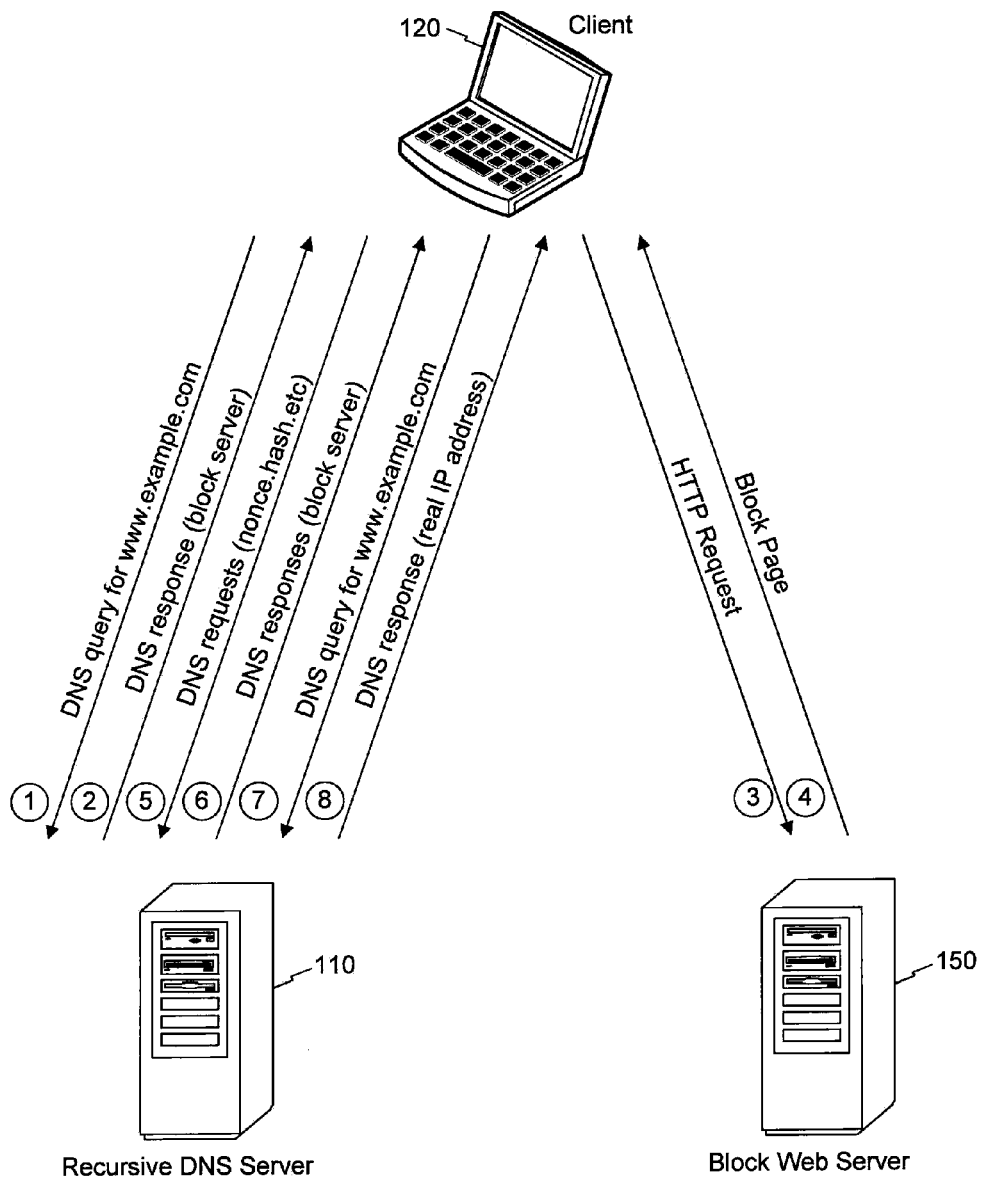
FIG. 5 is a condensed chart describing user access to a blacklisted web site, consistent with disclosed embodiments.

FIG. 5 shows a condensed chart of an exemplary process of the disclosed embodiments, which includes recursive DNS server 110, client 120, and block web server 150.

Figure 6A:
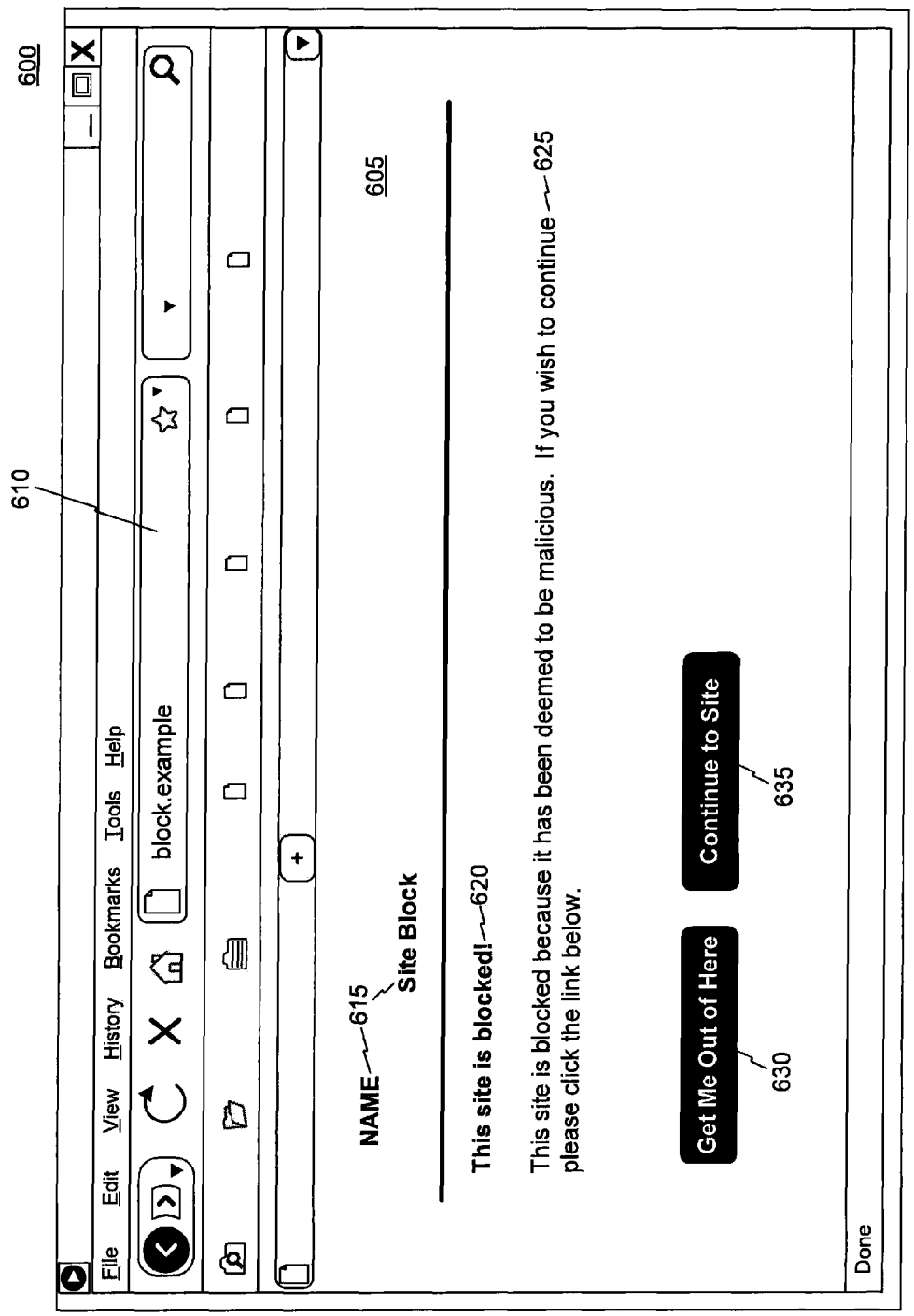
FIGS. 6A and 6B are diagrams showing a first example of a user attempt to access a blocked web page.
Figure 6B:
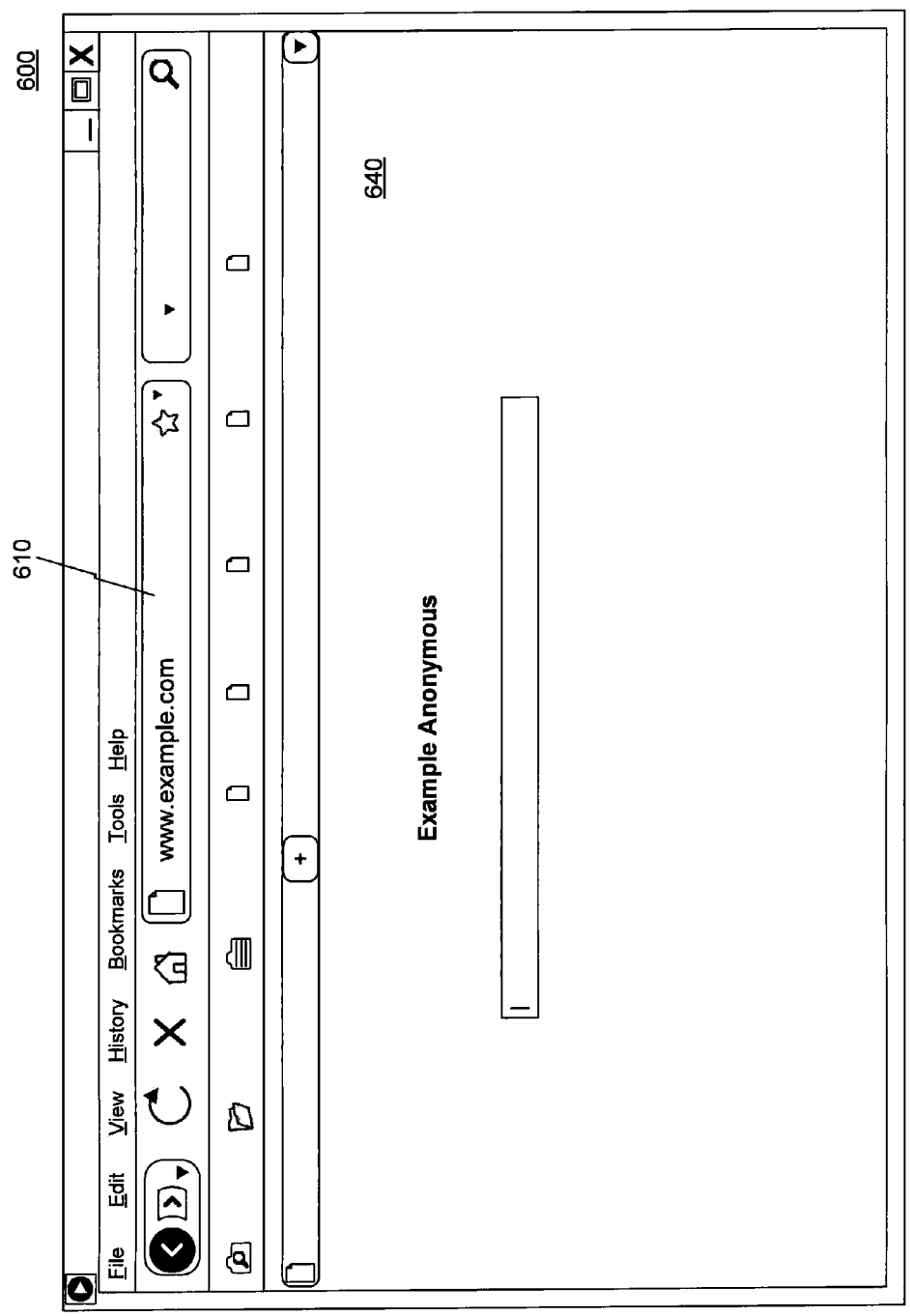

FIGS. 6A and 6B show an example of a user trying to access a blacklisted domain name, with the user being automatically brought to the corresponding web page after clicking a selectable item on a block page. As shown in display 600 of FIG. 6A, a user may open a browser and navigate to a web page by entering a blacklisted domain name, such as www.example.com, on address line 610. After trying to access this blacklisted domain, as described above, a block page 605 may be displayed. Block page 605 may include a title 615, a statement 620 that states the site is blocked, a reason 625 that describes a reason the site is blocked, and selectable items, such as buttons 630 and 635, which may give the user a choice to leave the site or continue to the site.

If the user clicks on button 630 to leave the blacklisted site, the browser may close, or the user may be brought to a whitelisted web site. If the user clicks on button 635 to continue to the blacklisted site, the processes described above take place, and in this example, JavaScript enables the browser to automatically reload the blacklisted website, and brings the user to the blacklisted web page 640, shown in FIG. 6B.

Figure 7A:
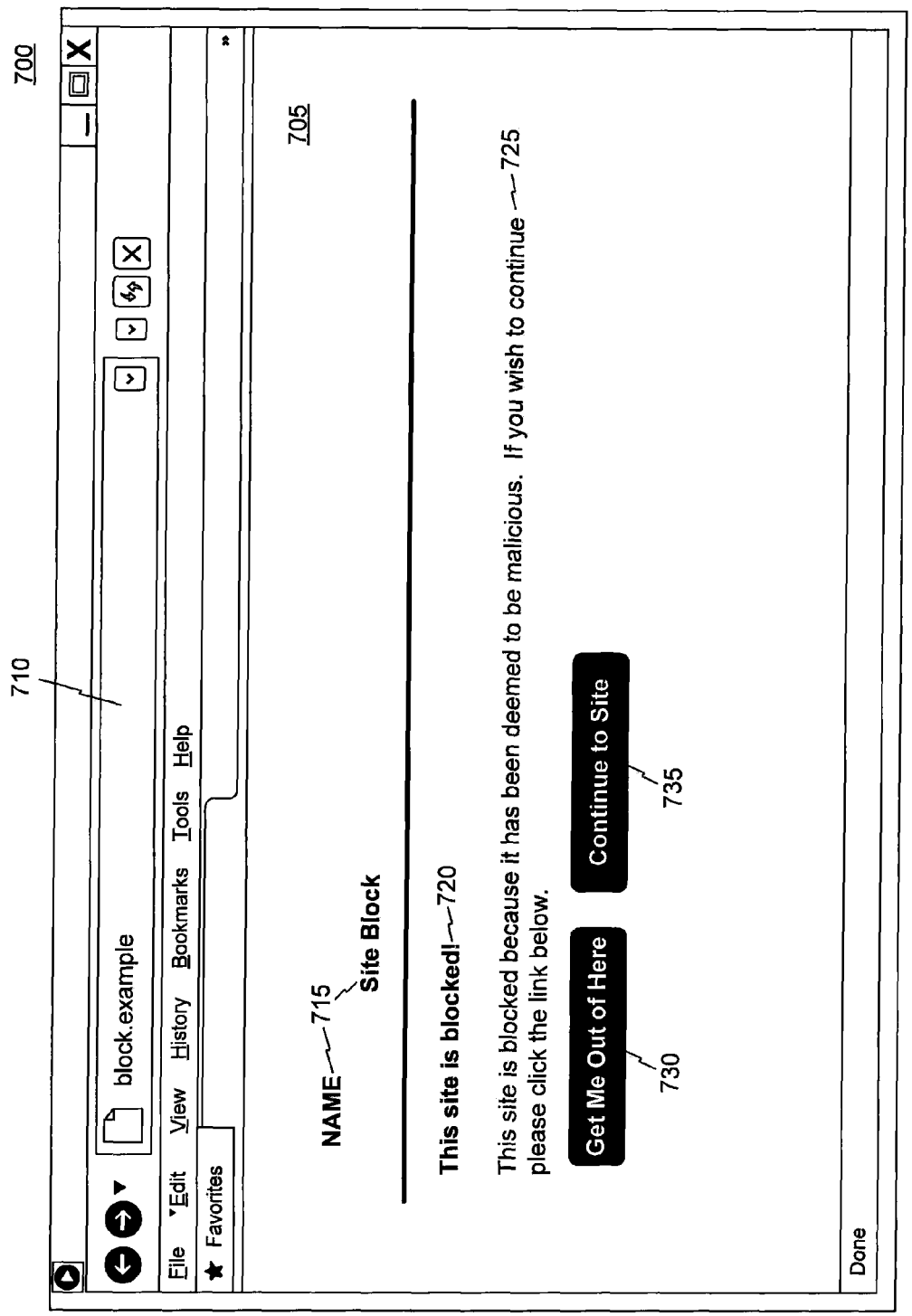
FIGS. 7A, 7B, and 7C are diagrams showing a second example of a user attempt to access a blocked web page.
Figure 7B:
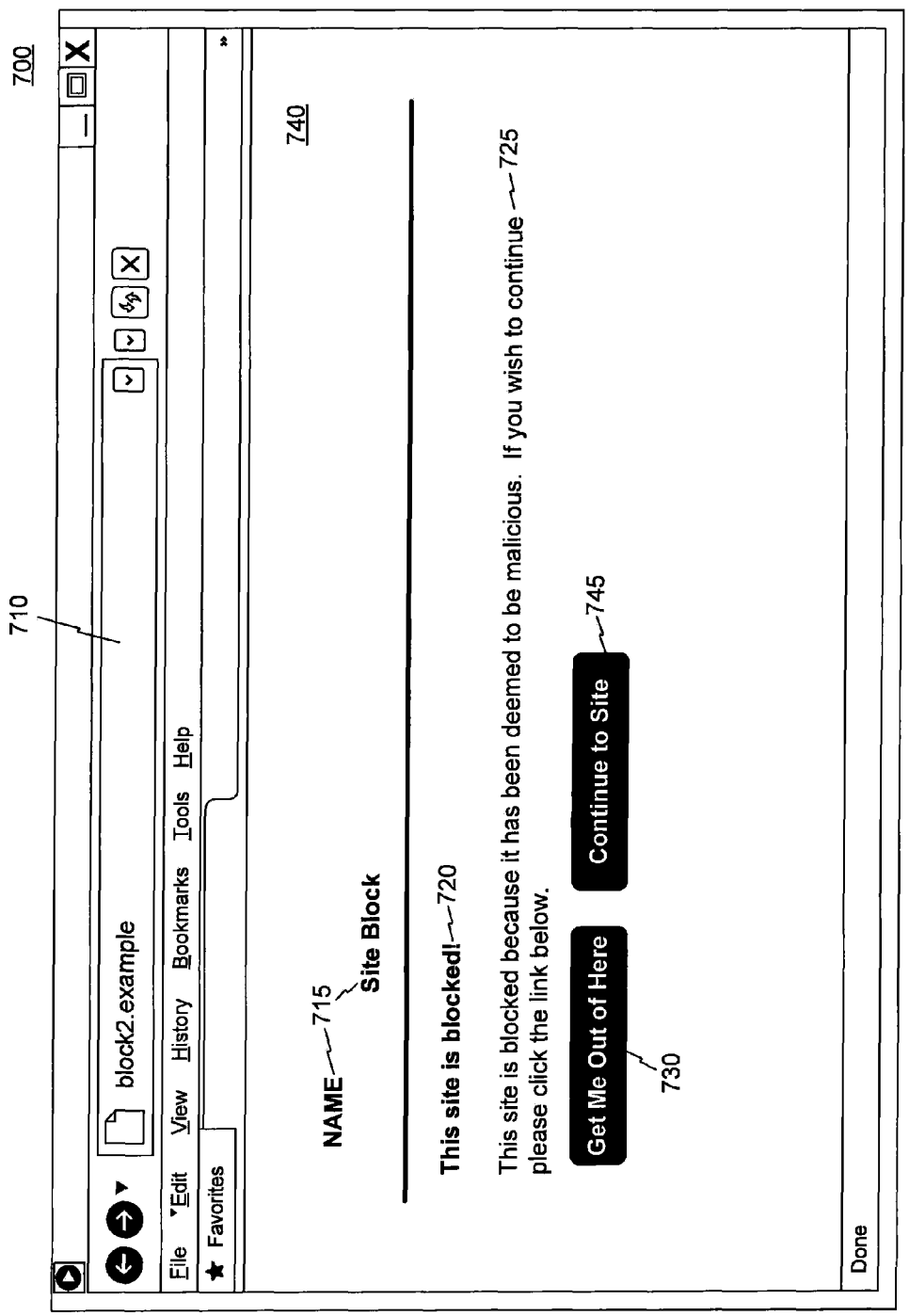
Figure 7C:
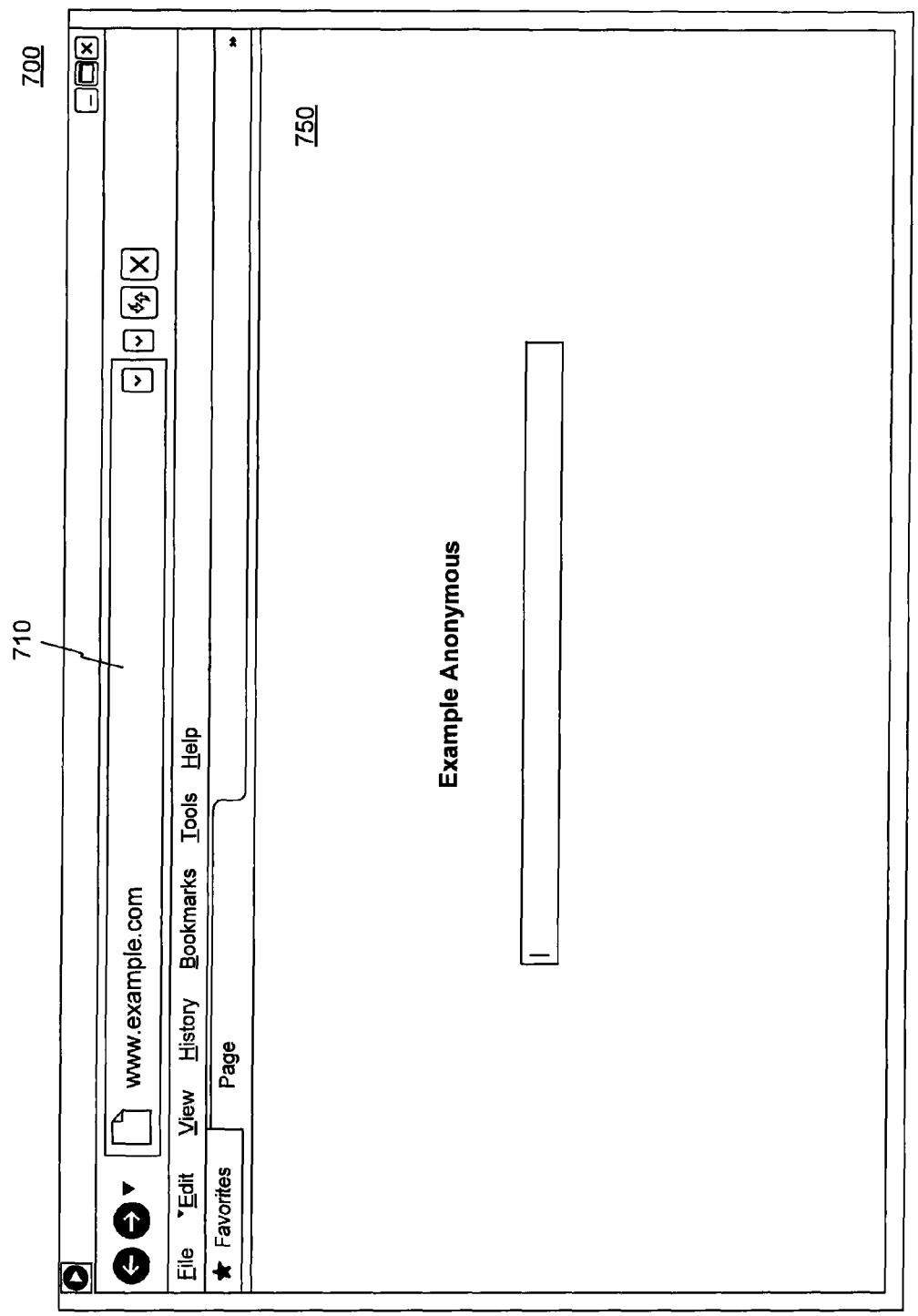

FIGS. 7A, 7B, and 7C show browser displays of a user trying to access a blacklisted domain name, for which the user is brought to a second block page after trying to access the blocked web page. As shown in display 700 of FIG. 7A, a user may open a browser and navigate to a web page by entering a blacklisted domain name, such as www.example.com, on address line 710. After trying to access this blacklisted domain, as described above, a block page 705 may be displayed. Block page 705 may include a title 715, a statement 720 that states the site is blocked, a reason 725 that describes a reason the site is blocked, and selectable items, such as buttons 730 and 735, which may give the user a choice to leave the site or continue to the site.

If the user clicks on button 730 to leave the blacklisted site, the browser may close, or the user may be brought to a whitelisted web site. If the user clicks on button 735 to continue to the blacklisted site, the processes as described above take place, and in this example, the user is brought to a second block page 740, shown in FIG. 7B. This block page may serve as protection when a user mistakenly clicks button 735 to continue to the blacklisted site, but does not actually want to continue to the site.

Block page 740 may include a title 715, a statement 720 that states the site is blocked, a reason 725 that describes a reason the site is blocked, and selectable items, such as buttons 730 and 745, which may give the user a choice to leave the site or ask if the user is sure the user wants to continue to the blocked site. If the user presses button 745, JavaScript enables the browser to automatically reload the blacklisted website, and bring the user to the blacklisted web page 750, shown in FIG. 7C.

Figure 8A:
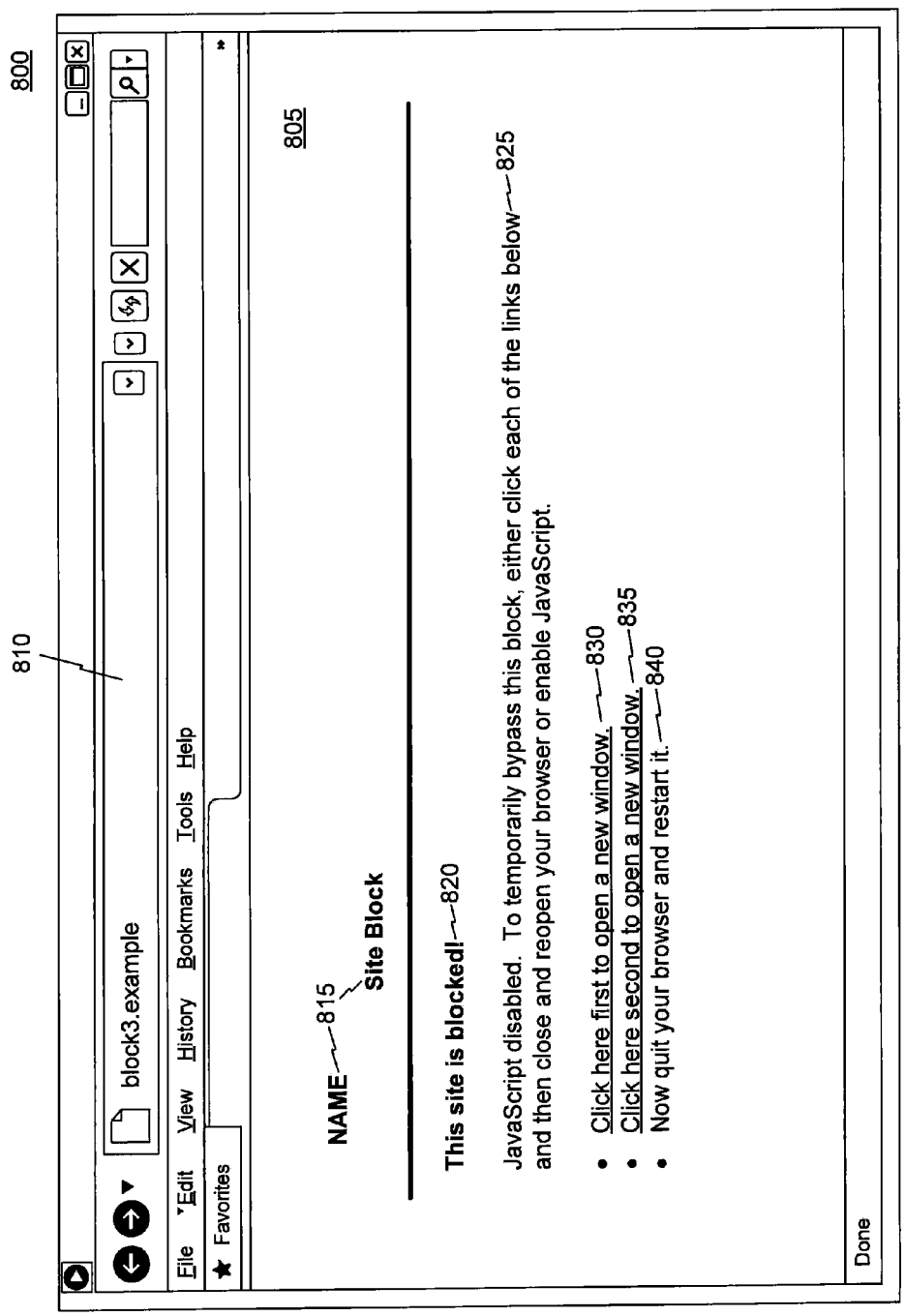
FIGS. 8A, 8B, 8C, 8D, 8E, and 8F are diagrams showing a third example of a user attempt to access a blocked web page.

FIGS. 8A-8F show browser displays of a user trying to access a blacklisted domain name, with JavaScript disabled on the user's browser. As shown in FIG. 8A, a user may open the browser and navigate to a web page 805 by entering a blacklisted domain name, such as www.example.com, on address line 810. After trying to access this blacklisted domain, as described above, a block page 805 may be displayed. Block page 805 may include a title 815, a statement 820 that states the site is blocked, and a reason 825 (JavaScript is disabled), and may tell the user how to proceed to access the blocked web page. To temporarily bypass the blocked web page, the user may either click each of the links below, and then close and reopen the browser, or may enable JavaScript. Accordingly, selectable items, such as links 830 and 835, are included on block page 805. Link 830 may state "Click here first to open a new window." Link 835 may state "Click here second to open a new window." Finally, an instruction 840 may state "Now quit your browser and restart it"

Figure 8B:
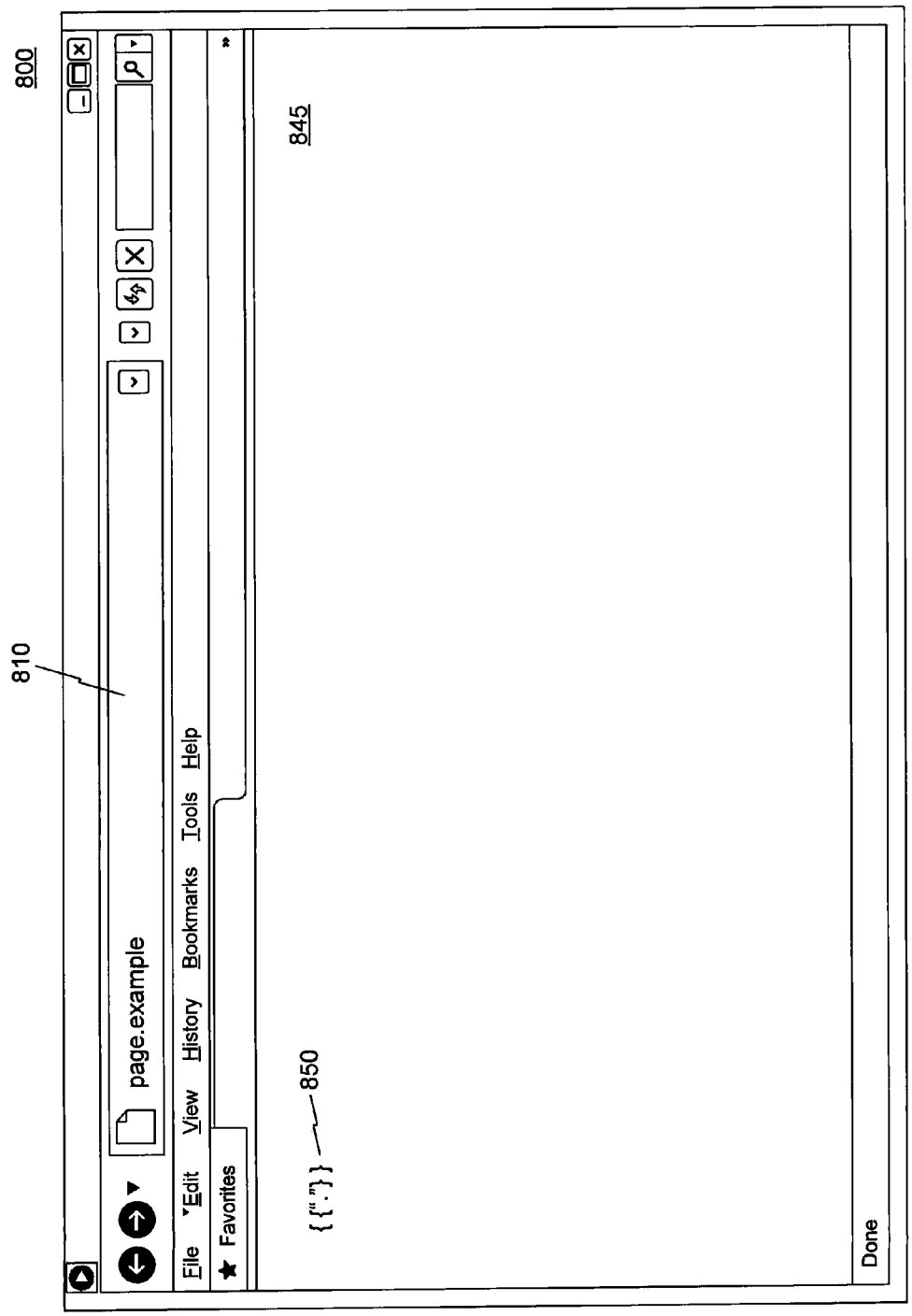
Figure 8C:
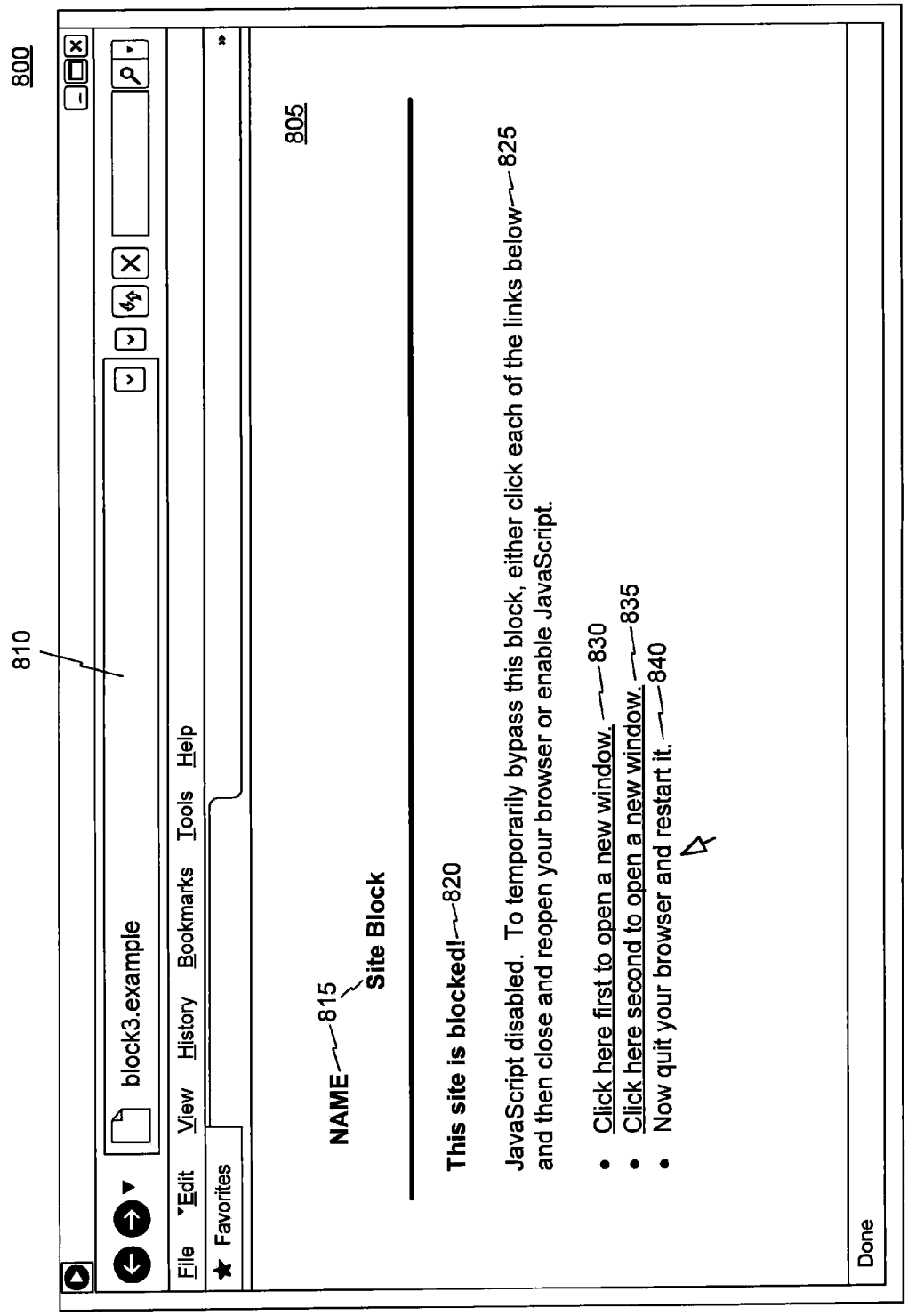
Figure 8D:
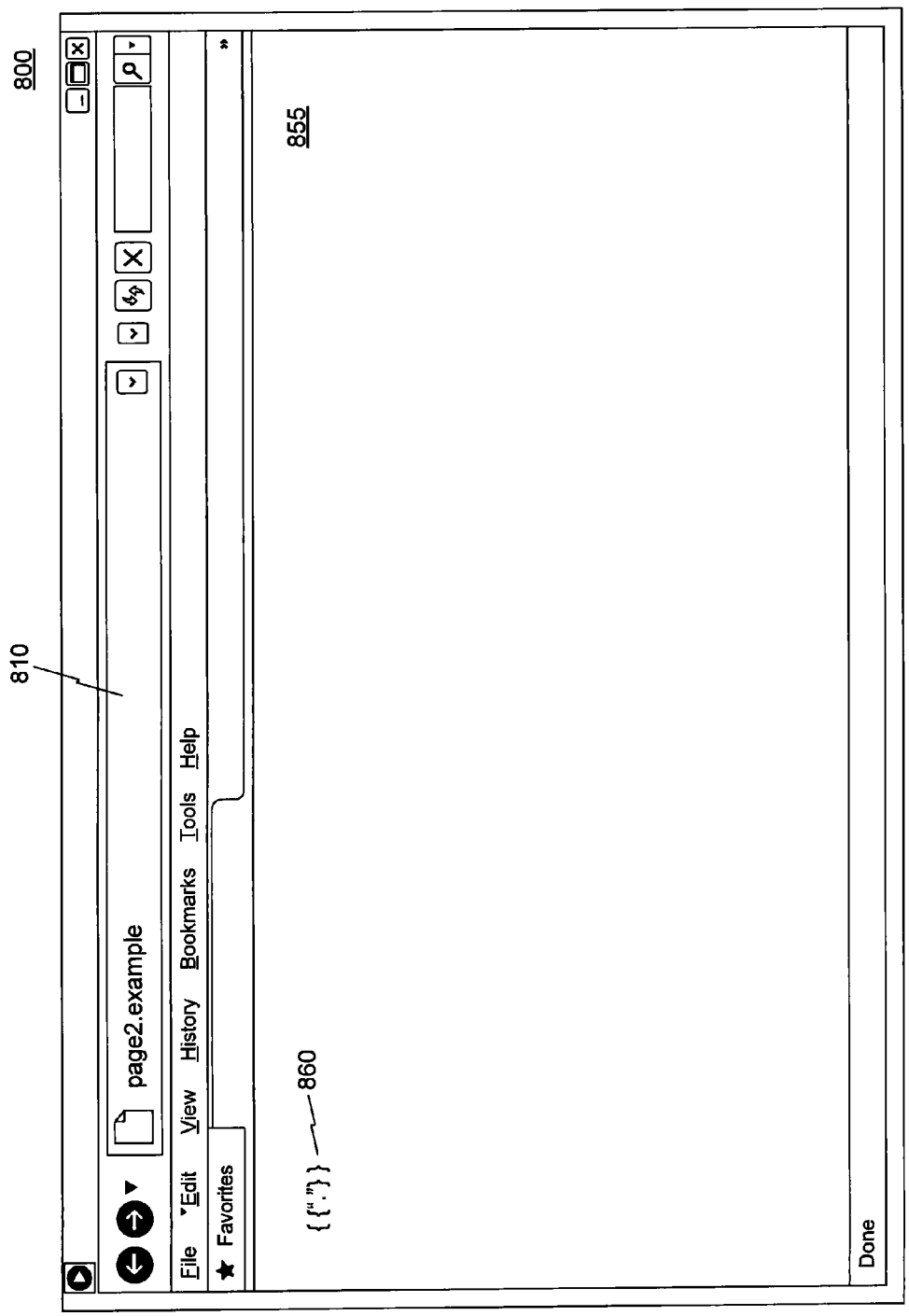

When a user clicks link 830, web page 845 is displayed, shown in FIG. 8B. Web page 845 may include content 850. The user can either close web page 845 or click back on the window of the browser that contains block page 805. After closing web page 845 or selecting block page 805, the user is again presented with block page 805, shown in FIG. 8C. Now the user can select link 835. After selecting link 835, web page 855 is presented to the user, shown in FIG. 8D. Web page 855 may include content 860.

Figure 8E:
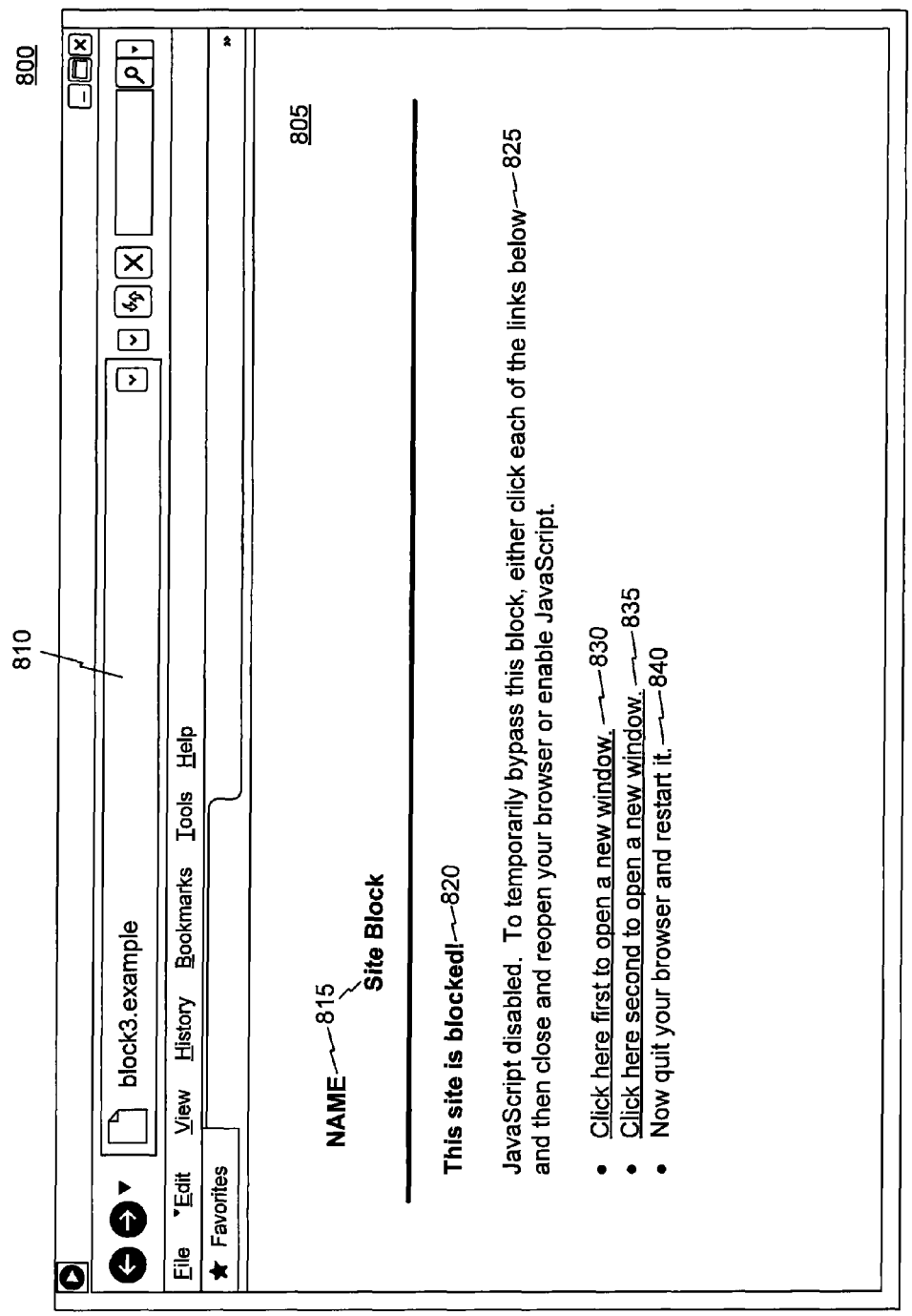
Figure 8F:
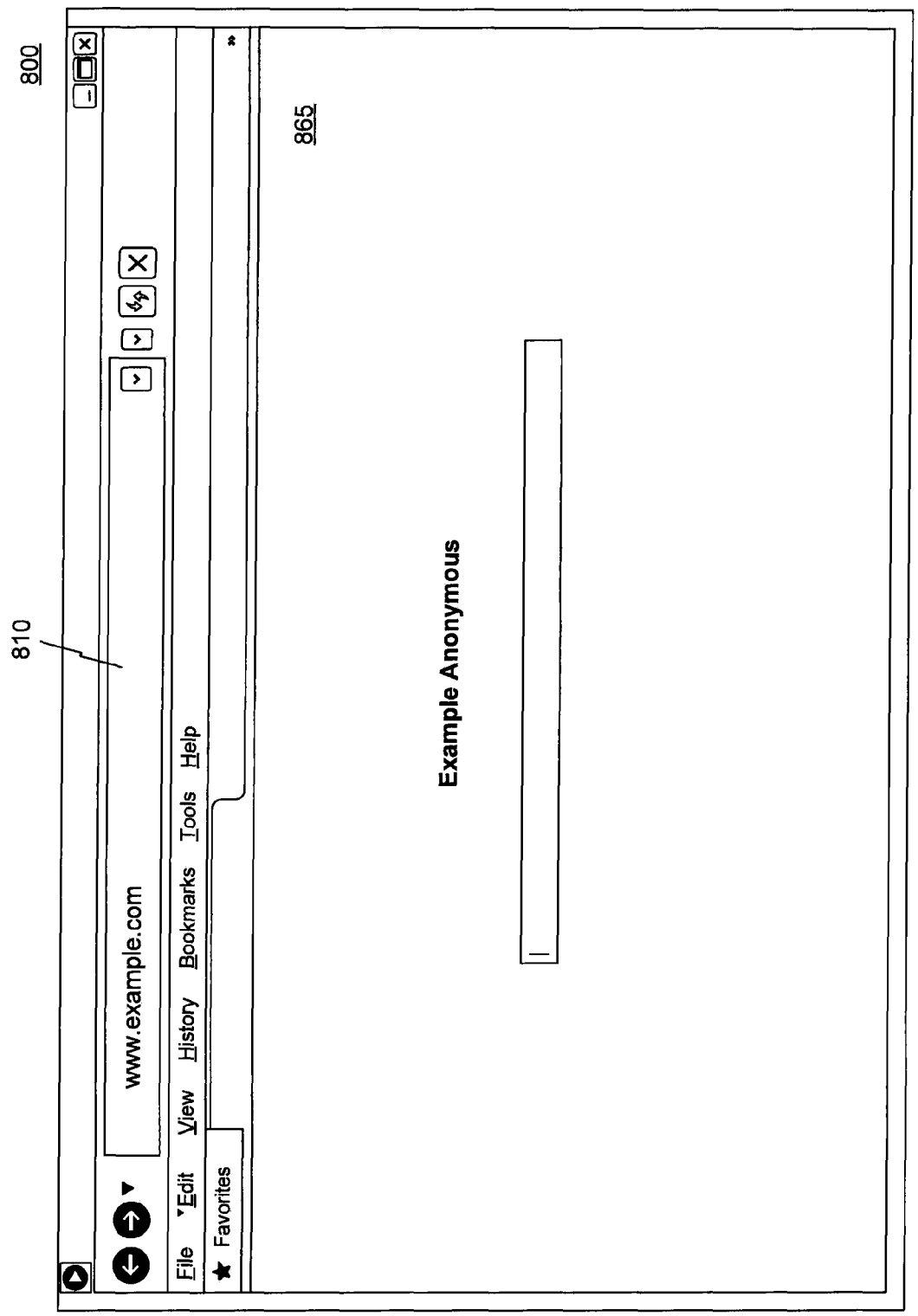

Again, the user may either close web page 855 or click back on the window of the browser that contains block page 805, both of which will present block page 805 to the user, shown in FIG. 8E. The user can now read and follow instruction 840, which tells the user to quit the browser and restart it. After the user quits and restarts the browser, the processes described above take place, and the user is presented with blocked web page 855, shown in FIG. 8F.

A further embodiment may provide to a user, operating client 120, an option to unblock a category of web sites that is classified or characterized by a particular subject, such as gambling. Thus, if a user is trying to access a blacklisted gambling site, the user may have the option to unblock all associated gambling sites. In this case, after the web browser sends a web site query to Recursive DNS server 110, Recursive DNS server 110 searches for and finds the category associated with the web site, and, as described above, a process begins for unblocking all sites in this category.

In a further additional embodiment, a user may be presented with a block page that includes buttons or other types of selectable items, a first one of which may unblock a single blacklisted web site, e.g., a gambling site, and a second one of which may unblock the entire category of web sites associated with the blacklisted website, e.g., all gambling sites. Thus, when a user selects a "category" button to unblock an entire category of web site domain names, a query, different from a query used to unblock a single web site domain name, may be sent from the web browser to Recursive DNS server 110. This "category" query would request domain names of all web sites associated with a particular category. Then, as described above, a process for whitelisting the entire category of web sites would begin.

Disclosed embodiments include computer systems having a processor and computer-readable storage media that include code for instructions to perform disclosed processes. Disclosed embodiments can include various types of computer-readable memory or storage device, such as a random access memory, a read-only memory, a mass storage device such as a hard disk, a CD, a DVD, and the like. Disclosed embodiments can include monitors, track balls, mice, keyboards, and the like. Disclosed embodiments can be connected to computers, cell phones, and other systems using a network. Various computers and systems can exchange information among the network. Disclosed embodiments can be deployed on any operation system or platform such as Linux based operating systems.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method, performed by a processor, for automatically adding a blacklisted site to a whitelist in response to a user's request, comprising:

requesting, by a web browser via a network, a blacklisted site, the blacklisted site having a domain name of the tag format <blocked-domain>;

generating at least one whitelisting query for an encoded domain, the encoded domain being a sequence in tag format: a nonce, a hash, a blocked-domain, and a static domain, each separated by a delimiter, wherein the nonce is a unique identifier for the at least one query, the hash is a cryptographic hash of an IP address of the user, a normalized timestamp, and the blocked domain, and the static domain is a constant domain representing the at least one query;

sending the at least one query to at least one recursive DNS server;

sending at least one response based on the at least one query to a cache of the web browser;

requesting, by the web browser, the blacklisted site via a network;

adding the blacklisted site to the whitelist stored on at least one recursive DNS server;

sending an IP address corresponding to the blacklisted site to the web browser; and accessing, by the web browser, the blacklisted site.

2. The method of claim 1, further comprising displaying, by the web browser, a first block page, the first block page including at least one of:
   instructions;
   a description of the blacklisted site; or
   a selectable item.

3. The method of claim 2, wherein the selectable item comprises at least one of:
   a first selectable item that, when selected, causes the web browser to display a whitelisted site;
   a second selectable item that, when selected, causes the web browser to display the blacklisted site;
   a third selectable item that, when selected, enables the web browser to display web sites associated with the blacklisted site;
   a first link that, when selected, causes the web browser to display a first web page; or
   a second link that, when selected, causes the web browser to display a second web page.

4. The method of claim 3, further comprising displaying a second block page, the second block page including a fourth selectable item that, when selected, causes the web browser to display a whitelisted site.

5. The method of claim 2, wherein a web server generates the first block page.

6. The method of claim 1, further comprising validating at least a portion of the at least one query before sending the IP address, corresponding to the blacklisted site, to the web browser.

7. The method of claim 1, further comprising adding the blacklisted site to the whitelist for a predetermined period of time.

8. The method of claim 1, wherein:
   the hash is generated on a web server;
   the hash comprises a shared secret; and
   the method further comprises preventing the web browser from accessing the shared secret.

9. The method of claim 1, wherein the sending of the at least one response fills the cache of the web browser.

10. A system for adding a blacklisted site to a whitelist comprising:
   a processor; and
   a memory containing executable code, that when executed by the processor, causes the processor to perform a method comprising:
      requesting, by a web browser via a network, a blacklisted site, the blacklisted site having a domain name of the tag format <blocked-domain>;
      generating at least one whitelisting query for an encoded domain, the encoded domain being a sequence in tag format: a nonce, a hash, a blocked-domain, and a static domain, each separated by a delimiter, wherein the nonce is a unique identifier for the at least one query, the hash is a cryptographic hash of an IP address of the user, a normalized timestamp, and the blocked domain, and the static domain is a constant domain representing the at least one query;
      sending the at least one query to at least one recursive DNS server;
      sending at least one response based on the at least one query to a cache of the web browser;
      requesting, by the web browser, the blacklisted site via a network;
      adding the blacklisted site to the whitelist stored on at least one recursive DNS server;
      sending an IP address corresponding to the blacklisted site to the web browser; and
      accessing, by the web browser, the blacklisted site.

11. The system of claim 10, further comprising
   displaying, by the web browser, a first block page, the first block page including at least one of:
      instructions;
      a description of the blacklisted site; or
      a selectable item.

12. The system of claim 11, wherein the selectable item comprises at least one of:
   a first selectable item that, when selected, causes the web browser to display a whitelisted site;
   a second selectable item that, when selected, causes the web browser to display the blacklisted site;
   a third selectable item that, when selected, enables the web browser to display web sites associated with the blacklisted site;
   a first link that, when selected, causes the web browser to display a first web page; or
   a second link that, when selected, causes the web browser to display a second web page.

13. The system of claim 12, further comprising
   displaying a second block page, the second block page including a fourth selectable item that, when selected, causes the web browser to display a whitelisted site.

14. The system of claim 13, wherein a web server generates the second block page.

15. The system of claim 10, further comprising
   validating at least a portion of the at least one query before sending the IP address, corresponding to the blacklisted site, to the web browser.

16. The system of claim 10, further comprising adding the blacklisted site to the whitelist for a predetermined period of time.

17. The method system of claim 10, wherein:
   the hash is generated on a web server;
   the hash comprises a shared secret; and
   the method further comprises preventing the web browser from accessing the shared secret.

18. The system of claim 10, wherein the sending of the at least one response fills the cache of the web browser.

19. A non-transitory computer-readable medium storing executable code which, when executed by at least one processor, performs a method, the method comprising:
   requesting, by a web browser via a network, a blacklisted site, the blacklisted site having a domain name of the tag format <blocked-domain>;
   generating at least one whitelisting query for an encoded domain, the encoded domain being a sequence in tag format: a nonce, a hash, a blocked-domain, and a static domain, each separated by a delimiter, wherein the nonce is a unique identifier for the at least one query, the hash is a cryptographic hash of an IP address of the user, a normalized timestamp, and the blocked domain, and the static domain is a constant domain representing the at least one query;

sending the at least one query to at least one recursive DNS server;

sending at least one response based on the at least one query to a cache of the web browser;

requesting, by the web browser, the blacklisted site via a network;

adding the blacklisted site to the whitelist stored on at least one recursive DNS server;

sending an IP address corresponding to the blacklisted site to the web browser; and accessing, by the web browser, the blacklisted site.

20. The medium of claim 19, the method further comprising displaying, by the web browser, a first block page, the first block page including at least one of:

instructions;

a description of the blacklisted site; or a selectable item.

21. The medium of claim 20, wherein the selectable item comprises at least one of:

a first selectable item that, when selected, causes the web browser to display a whitelisted site;

a second selectable item that, when selected, causes the web browser to display the blacklisted site;

a third selectable item that, when selected, enables the web browser to display web sites associated with the blacklisted site;

a first link that, when selected, causes the web browser to display a first web page; or a second link that, when selected, causes the web browser to display a second web page.

22. The medium of claim 21, the method further comprising displaying a second block page, the second block page including a fourth selectable item that, when selected, causes the web browser to display a whitelisted site.

23. The medium of claim 22, wherein a web server generates the first block page, the second block page, or both.

24. The medium of claim 19, the method further comprising validating at least a portion of the at least one query before sending the IP address, corresponding to the blacklisted site, to the web browser.

25. The medium of claim 19, the method further comprising adding the blacklisted site to the whitelist for a predetermined period of time.

26. The medium of claim 19, wherein:

the hash is generated on a web server;

the hash comprises a shared secret; and the method further comprises preventing the web browser from accessing the shared secret.

27. The medium of claim 19, wherein the sending of the at least one response fills the cache of the web browser.

\* \* \* \* \*